March 15, 1949.   M. C. RICHARDSON   2,464,346
AUXILIARY SPACE THERMOSTAT
Filed March 1, 1944

INVENTOR
M.C. RICHARDSON
By C.B. Birkenbeuel
ATTORNEY

Patented Mar. 15, 1949

2,464,346

UNITED STATES PATENT OFFICE 2,464,346

AUXILIARY SPACE THERMOSTAT

Max C. Richardson, Portland, Oreg., assignor to Iron Fireman Manufacturing Company, Portland, Oreg.

Application March 1, 1944, Serial No. 524,571

2 Claims. (Cl. 236—91)

This invention relates generally to automatic controls for heat generating devices and particularly to an auxiliary space thermostat.

The main object of this invention is to devise an apparatus for controlling the temperature of a space or room by utilizing the temperature difference between the space itself and the outdoor temperature as a basis for actuating the mechanism.

The second object is to devise an inexpensive thermostatic control for a given space which will overcome what is known as a "cold seventy" condition. That is, one in which the temperature in the usual thermostat may be seventy while the temperature at the floor may be from five to ten degrees lower due to a stratification of the room air, a condition which is not noticeably bad in the spring and fall but becomes markedly noticeable as winter conditions becoming more severe.

The third object is to devise a control apparatus which will insure a predetermined temperature for any desired length of time, not only in the immediate vicinity of the usual thermostat but also at different levels and locations in the space itself.

The fourth object is to provide an apparatus of the class described which will be adaptable for use in poorly or well constructed buildings without or with heavy walls and fireproof construction, with much or little single or double glazing, with or without weather stripping, and subject to different internal conditions such as might be found in a large auditorium intermittently filled with people, or in places where the number of occupants is fairly fixed, or places having large or small heat additions due to modern commercial lighting methods.

I accomplish the above stated objects of invention in the manner set forth in the following specification as illustrated in the accompanying drawings, in which.

Figure 1:
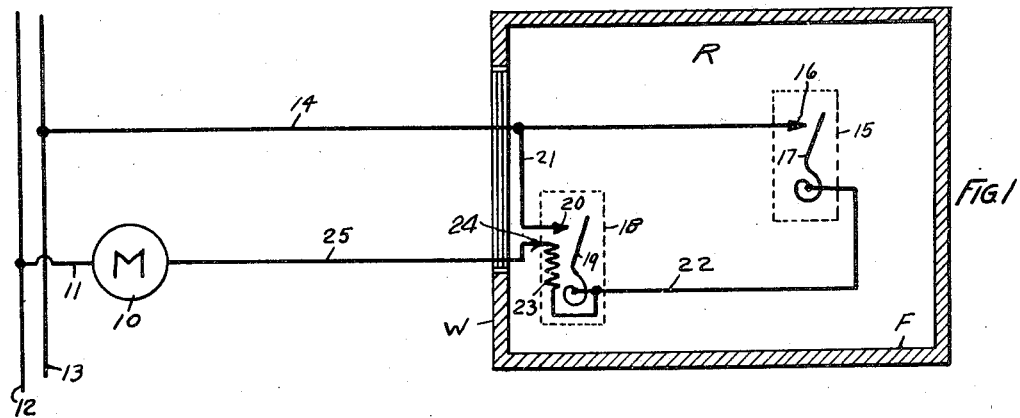
Fig. 1 is a diagrammatic view of a simple form of line voltage circuit showing a condition in which the temperatures at both thermostats are normal.

Referring in detail to the drawing, there is shown in Fig. 1 a stoker motor 10, which will be referred to as a power absorbing means. The motor 10 is connected by a lead 11 to one side 12 of a power line whose side 13 is connected by a lead 14 to the conventional room thermostat 15, which will be referred to as a first thermostat. It will be understood that this first thermostat 15 will, in most cases, occupy the usual thermostat position in the room R to control the heat supply in a way that will always supply enough heat to keep that thermostat satisfied, that is, in a circuit opening position at the contact 16, due to the fact that bimetallic element 17 has moved away from the contact 16 when the temperature of the air close to the thermostat 15 reaches a predetermined maximum temperature.

A second thermostat 18, responsive to a "cold seventy" condition, contains a bimetallic element 19 and a contact 20 which is joined to the lead 14 by a wire 21. The element 19 is connected by a wire 22 to a heating coil 23 whose slidable contact 24 is connected by the lead 25 to the stoker motor 10.

Now the contact 20 and element 19 are normally separated but are arranged to close under a sufficient drop of temperature at a point where a "cold seventy" condition is present. That is to say, if the second thermostat 18 is located near the floor F or near an outside wall W, or in a cold air return duct and there occurs a sufficient drop in temperature, current will flow to the motor 10 and operate the stoker to deliver heat to the room or space for a limited time, that is, until there is sufficient heat generated by the coil 23 to open the circuit through the thermostat 18.

In other words, if the thermostat 15 is set to close at seventy degrees F. and the thermostat 18 is set to close at sixty-five degrees F. then when the temperature around the thermostat 18 falls below sixty-five degrees F. there is caused a heat generating condition which anticipates the one about to be called for by the thermostat 15, so that having performed its temporary function of supplying the heat until the thermostat 15 takes over the control, the thermostat 18 becomes inoperative.

During the operation of the motor 10 by the thermostat 18 there have occurred several distinct actions. First, there has been a breaking up of the air stratification which produced the "cold seventy" effect. Second, it has rendered the first thermostat 15 more sensitive by anticipating its calls for heat, and third, by operating the heating plant or air circulating means, it has restored the comfort to the heated space R in a shorter time by using the overheated air near the ceiling to restore the proper temperature at the levels below the thermostat 15.

Figure 2:
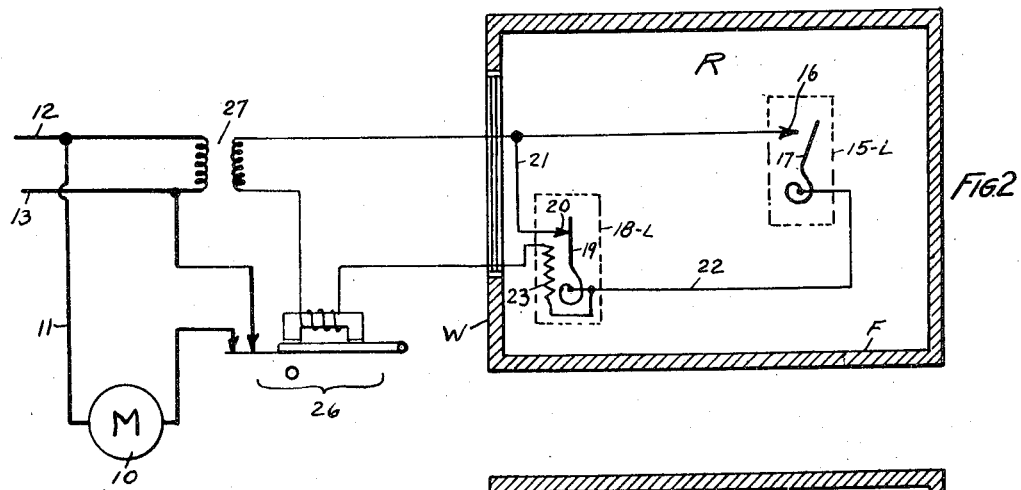
Fig. 2 is a diagrammatic view of a low voltage circuit incorporated in the device, illustrating a condition in which the "cold seventy" effect causes the motor to operate.

In Fig. 2 is shown the dual pair of thermostats 15 and 18 as shown in Fig. 1, with the addition of a relay 26 and a transformer 27, the purpose of which being obviously to permit the use of low voltage thermostats 15—L and 18—L, indicating a condition in which the temperature at the thermostat 15 is normal and the temperature at the thermostat 18 is subnormal.

Figure 3:
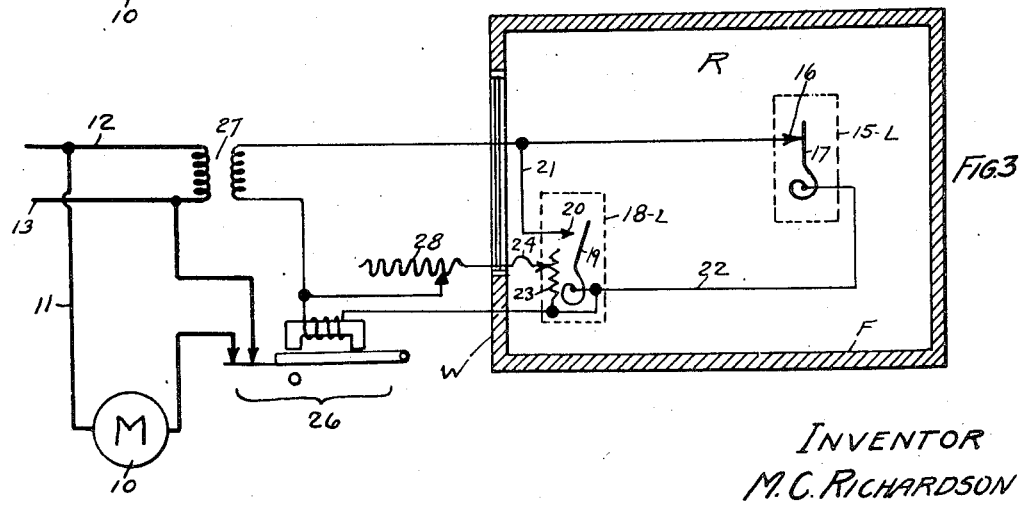
Fig. 3 is a diagrammatic view of a preferred form of low voltage circuit, showing a condition in which the temperature at the thermostat 15 is subnormal and the temperature at the thermostat 18 is also subnormal but has been artificially raised.

In Fig. 3, which is a modification of the forms as shown in Fig. 2, there is introduced a control element 28 preferably in the form of a rheostat by means of which the flow of current to the heating element 23 may be varied. By the introduction of this element it is possible to vary the length of the preliminary or anticipating heating period.

It will be thought that from the foregoing it will be readily understood that while the two thermostats 15—L and 18—L may be identical in construction, they need to differ from each other merely in their relative positions and adjustments. To restate the matter, the first thermostat 15 or 15—L strives to maintain a predetermined temperature at its immediate vicinity without regard to the temperatures elsewhere and the second thermostat 18 or 18—L is concerned only with temperatures at locations where the "cold seventy" effect can be experienced, as near an outside wall W or near the floor F.

While I have referred to the duty of the second thermostat 18 or 18—L as anticipating the needs of the first thermostat 15 or 15—L, it can be seen that a portion of the advantage arising from this anticipation flows from the fact that the starting of the stoker, especially with a warm air plant, causes a flow of heat through the air ducts and a consequent breaking up of the strata of differently heated air.

While I have thus illustrated and described my invention, it is not my desire to be limited to the precise form shown herein, which is of course largely diagrammatic, but I intend to cover all such forms as fall fairly within the appended claims.

I claim:

1. In a system for controlling the temperature of a room, said temperature tending to be lower at lower levels in the room, means for supplying heat to the room, a thermostat responsive to the temperature of the air in the room at the breathing line level, a second thermostat responsive to the temperature of the air in the room adjacent the floor, an intermittently effective auxiliary electric heater located adjacent said second thermostat to vary the effect of ambient temperature thereon, said thermostats being connected in parallel, said auxiliary electric heater being connected in series with the parallel circuits of said thermostats and means controlled by said series parallel circuit of said auxiliary heater and said thermostats for controlling said heat supplying means.

2. In a system for controlling the temperature of a room, said temperature tending to be relatively lower at certain locations in the room and relatively higher at certain other locations in the room, means for supplying heat to the room, a thermostat responsive to the temperature of the air in the room at the location of relatively higher temperature, a second thermostat responsive to the temperature of the air in the room at a location of relatively lower temperature, an intermittently effective auxiliary electric heater located adjacent said second thermostat to vary the effect of ambient temperature thereon and control means for starting and stopping said heat supplying means, said control means comprising an electric circuit adapted to start said heat supplying means when said circuit is closed and to stop said heat supplying means when said circuit is open, said auxiliary electric heater being connected into said circuit in series arrangement, and said thermostats being connected into said circuit in parallel arrangement.

MAX C. RICHARDSON.

REFERENCES CITED

The following references are of record in the file of this patent:

UNITED STATES PATENTS

| Number | Name | Date |
|---|---|---|
| 1,925,455 | Morgan | Sept. 5, 1933 |
| 2,181,427 | Grant | Nov. 28, 1939 |
| 2,209,941 | Stuart | July 30, 1940 |
| 2,223,283 | Grant et al. | Nov. 26, 1940 |
| 2,329,614 | Holmes | Sept. 14, 1943 |
| 2,331,737 | Scoggin | Oct. 12, 1943 |

FOREIGN PATENTS

| Number | Country | Date |
|---|---|---|
| 499,235 | Great Britain | Jan. 20, 1939 |